(12) United States Patent
Furst

(10) Patent No.: US 8,684,453 B2
(45) Date of Patent: Apr. 1, 2014

(54) PORTABLE PICNIC TABLE AND HITCH

(76) Inventor: Eric Alexander Furst, Kutztown, PA (US)

( * ) Notice: Subject to any disclaimer, the term of this patent is extended or adjusted under 35 U.S.C. 154(b) by 65 days.

(21) Appl. No.: 13/439,056

(22) Filed: Apr. 4, 2012

(65) Prior Publication Data

US 2013/0264848 A1 Oct. 10, 2013

(51) Int. Cl.
- *A47B 3/00* (2006.01)
- *A47B 3/06* (2006.01)
- *A47B 3/14* (2006.01)
- *A47B 83/02* (2006.01)
- *B60P 3/34* (2006.01)
- *B62D 33/08* (2006.01)

(52) U.S. Cl.
USPC .......... 297/158.4; 297/157.1; 297/158.2; 297/158.3; 297/158.5; 297/159.1; 296/26.08; 296/26.09; 296/64

(58) Field of Classification Search
USPC .......... 297/135, 157.1, 158.1, 158.2, 158.3, 297/158.4, 158.5, 159.1; 296/26.08, 26.09, 296/64
See application file for complete search history.

(56) References Cited

U.S. PATENT DOCUMENTS

| | | | | |
|---|---|---|---|---|
| 3,797,884 A | * | 3/1974 | Gutierrez | 297/158.4 |
| 4,932,333 A | * | 6/1990 | Jensen et al. | 297/158.4 X |
| 5,752,639 A | * | 5/1998 | Rice | 224/521 |
| 5,833,308 A | * | 11/1998 | Strong et al. | 297/172 |
| 5,857,741 A | * | 1/1999 | Anderson | 297/170 |
| 6,082,269 A | * | 7/2000 | Padberg | 108/44 |
| 6,189,458 B1 | * | 2/2001 | Rivera | 108/44 |
| 6,269,578 B1 | * | 8/2001 | Callegari | 42/94 |
| 6,314,891 B1 | * | 11/2001 | Larson | 297/158.4 X |
| 6,347,831 B1 | | 2/2002 | Nye et al. | |
| 6,511,088 B2 | * | 1/2003 | Kahlstorf | 280/415.1 |
| 6,739,269 B1 | * | 5/2004 | Benton | 108/44 |
| 6,739,643 B1 | * | 5/2004 | Rock et al. | 296/64 |
| 6,808,231 B1 | * | 10/2004 | Hill | 297/217.7 |
| 6,935,064 B1 | * | 8/2005 | Thompson | 42/94 |
| 7,090,104 B2 | * | 8/2006 | Dorety | 224/524 |
| 7,152,358 B1 | * | 12/2006 | LeAnna et al. | 42/94 |
| 7,552,686 B2 | * | 6/2009 | Fisher | 108/44 |
| 7,757,613 B2 | * | 7/2010 | Fisher | 108/44 |
| 7,819,128 B2 | * | 10/2010 | Clark et al. | 135/88.08 |
| 8,166,695 B2 | * | 5/2012 | Pippin | 42/94 |
| 8,205,937 B2 | * | 6/2012 | Rivera et al. | 297/158.4 |
| 8,291,832 B2 | * | 10/2012 | Fisher | 108/44 |
| 8,479,667 B2 | * | 7/2013 | Rivera et al. | 297/158.4 X |
| 2008/0006184 A1 | | 1/2008 | Simon | |

\* cited by examiner

*Primary Examiner* — Rodney B White

(74) *Attorney, Agent, or Firm* — Cheryl R. Figlin, Esq.; Feigin & Associates, LLC.

(57) ABSTRACT

Embodiments of the disclosed technology comprise a device for transporting picnic tables. A transporting apparatus that connects to a hitch of a vehicle that is specifically designed to hold a foldable picnic table. The picnic table further comprising condiment shelves, wheels and side tables.

26 Claims, 10 Drawing Sheets

PORTABLE PICNIC TABLE AND HITCH

FIELD OF THE DISCLOSED TECHNOLOGY

The disclosed technology relates to a picnic table and a transportation method thereof.

BACKGROUND OF THE DISCLOSED TECHNOLOGY

Foldable and portable picnic tables are known. They are great for setting up a comfortable picnic anywhere. However, the picnic tables are still very heavy and hard to transport to different locations. It would be convenient to have the ability to connect your picnic table to the hitch of a car. The picnic table can then be taken almost anywhere. It would be even more convenient that this connection allow the table to be set up at any distance from the vehicle rather than be supported by its attachment to the vehicle. Furthermore, with minimal effort, an optional wheel kit can install that allows the table to be rolled and set up either near the vehicle in a parking lot or in another area some distance from the vehicle. An easy and reliable way to put a picnic table on a vehicle along with the ability to roll the table once off the vehicle would increase convenience and ease of use.

SUMMARY OF THE DISCLOSED TECHNOLOGY

The disclosed technology described herein addresses an unfulfilled need in the prior art by providing a method of transporting a picnic table to and from different locations.

One objective of the disclosed technology is to provide picnic table and transportation apparatus with a lateral hitch member for connecting to a trailer hitch receiver of a vehicle on one end and a substantially vertical table mount member on the other end of the lateral hitch member. A mounting post extends laterally from the substantially vertical table mount member. A folding picnic table with apertures through the table top such that the folding picnic table attaches to the transportation apparatus through the apertures on the table top. The angle between said substantially vertical table mount member and said lateral hitch member is between 90 and 135 degrees, inclusive.

Another objective is to provide a picnic table and transportation apparatus, wherein the folding picnic table folds in half perpendicular to its long axis. Also apertures of a folding picnic table are placed on the mounting post extending laterally from the table mount member such that the folding picnic table can be transported on a vehicle. The mounting post would also have a removable circular cap member having an aperture which goes on the mounting post after the table. The mounting post would also have sides with two apertures across from each other such that a pin member can go through the apertures of the mounting post to hold picnic table and cap member onto the table mount member.

The mounting post is a cylindrical shape and the apertures of the table are circular in one embodiment. In another embodiment, the mounting post is a cube shape and the apertures of the table are square. Folding picnic table also has a condiment shelf; condiment shelf having an underside and top side; picnic table top having an underside and topside; underside of said condiment shelf having a plurality of legs connecting the condiment shelf to the table top, topside, such that the condiment shelf is positioned horizontally above the table top when table is open. The condiment shelf has apertures and folds in half perpendicular to its long axis.

Another objective is that the apertures of a folding picnic table and the apertures of the condiment shelf are placed on the mounting post extending laterally from the substantially vertical table mount member such that the folding picnic table and condiment shelf can be transported on a vehicle. The table mount member can be movably attached to the lateral hitch member, such that the table mount member is adjustable to a plurality of positions. The angle between table mount member and lateral hitch member moves between 90 and 180 degrees, inclusive.

Another objective is a table top with a plurality of protrusions extending laterally from one or both ends of table top. These protrusions can be used to connect a side table when the table is open. These protrusions can also connect to wheels when the table is closed. The connection between protrusion and side table can be with a scaffolding pin, and connection between protrusion and wheels can also be with a scaffolding pin.

In another objective the table can be a table top having a top side and an under side with two benches having a top side and an under side. The table top having four legs and each leg having two ends and configured in a U shape. One end of each leg is movably attached and starts at the under side of the table top and curves around to movably attach to underside of benches, two legs to each bench. The U shaped bottom of the legs rest on the ground supporting both the table top and two benches. Each leg has a telescoping portion to lower the table top to bench height and each leg folds up to be adjacent to the table top and benches. Table top also has hollow areas on each side of the table along the length of the table. Benches also having hollow areas on each side of the bench along the length of the bench. These hollow areas of the table top and benches having sliding tracks inside.

The table and benches separate into halves perpendicular to the long axis while still being connected by the sliding tracks. Sliding tracks have pivoting sections such that the table top and benches can fold in half perpendicular to the long axis but stay connected by sliding tracks. This kind of table also has a condiment shelf; condiment shelf having an underside and top side; a plurality of legs connected to the condiment shelf underside and to the table top topside to position the condiment shelf horizontally above the table top when table is open This condiment shelf separates into halves perpendicular to the long axis while still being connected to the plurality of legs connected to the condiment shelf underside; and plurality of legs are hollow and telescoping and shorten such that the condiment shelf underside is adjacent to the topside of the table top when the table is in a folded position.

Another objective is a method of transporting a picnic table using a transporting apparatus comprising a folding a picnic table having apertures in the table top by first using telescoping legs to lower the table top to the same height as two benches. Then folding legs are attached to both benches and table top such that the legs are adjacent to the table top and benches. The benches and table top are folded in half, perpendicular to a long axis, such that the apertures on either side of the table top are now juxtaposed. The apertures of the table top are placed on a mounting post of a transporting apparatus and transporting apparatus is attached to a hitch receiver of a vehicle. Transporting the folding picnic table on the transporting apparatus by driving the vehicle to the location desired.

Further the method would include the folding picnic table having wheels attached on the end of the table closest to the ground. The locking pin on a mounting post would be removed and the adjustable table mount would be lowered to a horizontal position by removing a hitch pin and lowering the adjustable table mount. The folding picnic table is taken off of table mount when the adjustable table mount is in a horizontal position and the folding picnic table is lifted by a user on the opposite end than the wheels. Folding picnic table is now rolled to a location desired.

In a final objective a folding picnic table with a table top having a top side and an under side. The table has two benches having a top side and an under side and the table top having four legs. Each leg has two ends and is configured in a U shape and one end of each leg is movably attached starting at the under side of the table top and curves around to movably attach to underside of benches, two legs to each bench. The U shaped bottom of the legs rest on the ground supporting both the table top and two benches with each leg having a telescoping portion to lower table top to bench height. Each leg also folds up to be adjacent to the table top and benches.

The table top also has hollow areas on each side of the table along the length of the table and benches also having hollow areas on each side of the bench along the length of the bench. Hollow areas of the table top and benches having sliding tracks inside. The table and benches separate into halves perpendicular to the long axis while still being connected by the sliding tracks. The sliding tracks have pivoting sections such that the table top and benches can fold in half perpendicular to the long axis but stay connected by sliding tracks.

In accordance with these and other objectives, which will become apparent hereinafter, the disclosed technology will now be described with particular reference to the drawings.

Figure 1:
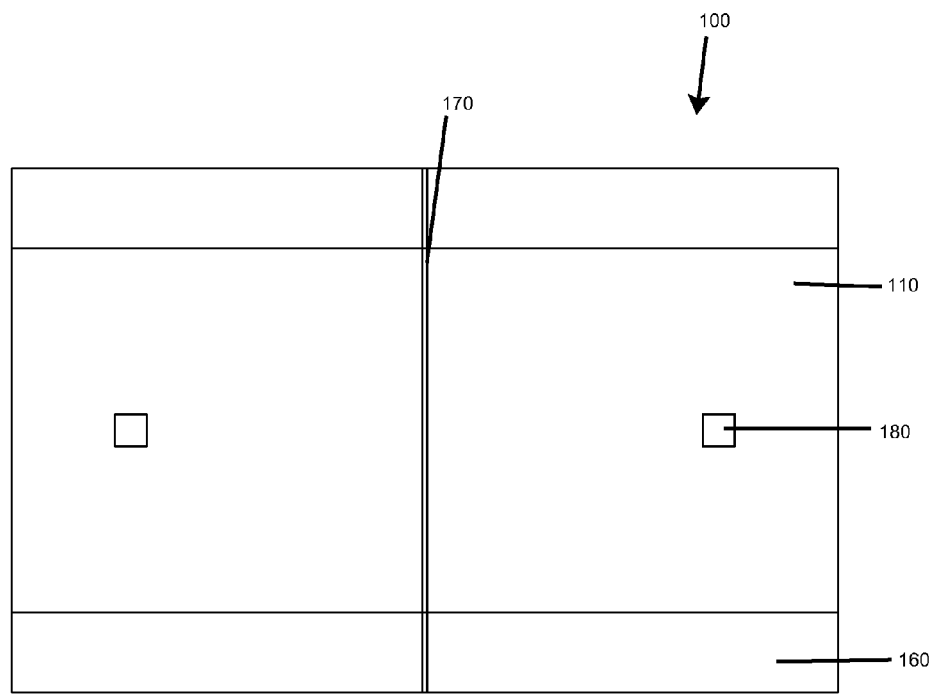
FIG. 1 shows a top view of the portable picnic table in the open position of the disclosed technology.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The ensuing detailed description provides preferred exemplary embodiments only, and is not intended to limit the scope, applicability, or configuration of the disclosed technology. Rather, the ensuing detailed description of the preferred exemplary embodiments will provide those skilled in the art with an enabling description for implementing the preferred exemplary embodiments of the technology. Various changes may be made in the function and arrangement of elements without departing from the spirit and scope of the disclosed technology, as set forth in the appended claims.

To aid in describing the disclosed technology, directional terms may be used in the specification and claims to describe portions of the present technology (e.g., upper, lower, left, right, etc.). These directional definitions are merely intended to assist in describing and claiming the disclosed technology and are not intended to limit the disclosed technology in any way. In addition, reference numerals that are introduced in the specification in association with a drawing figure may be repeated in one or more subsequent figures without additional description in the specification, in order to provide context for other features.

With reference now to the drawings, a device is shown for an apparatus for transporting a portable folding picnic table with benches and a portable folding picnic table with benches designed for the transportation apparatus.

Figure 2:
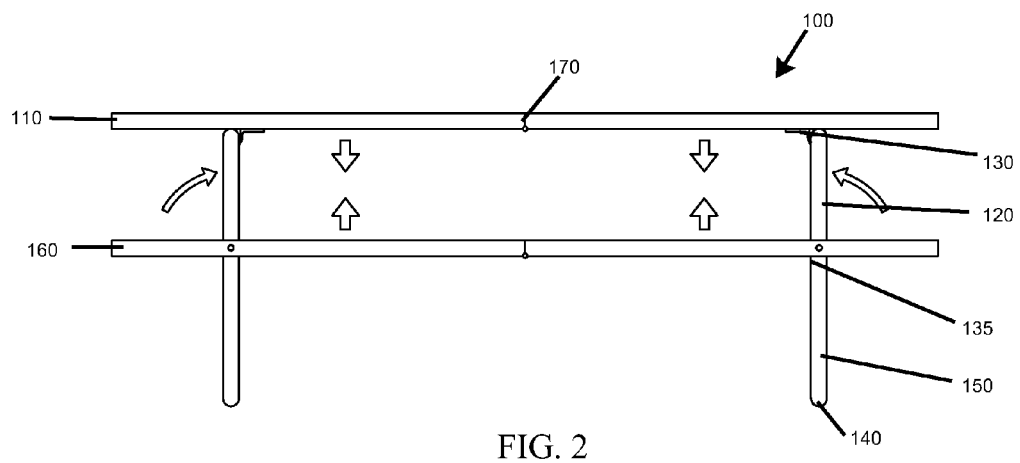
FIG. 2 shows a side view of the portable picnic table in the open position of the disclosed technology.

Referring to FIG. 1, reference number 100 refers generally to a foldable picnic table designed for a transporting apparatus and a first embodiment of the current technology. FIGS. 1 and 2 both have table top 110 connected with hinges 130 to legs 120. Legs 120 have a bottom substantially U shaped portion 140 that rests on the ground when the table 100 is in the open position. Legs 120 have a portion 150 better seen in FIG. 11 attached with hinges 135 to benches 160. Both the benches 160 and the table top 110 can fold in half using hinges 170, perpendicular to the long axis.

Figure 11:
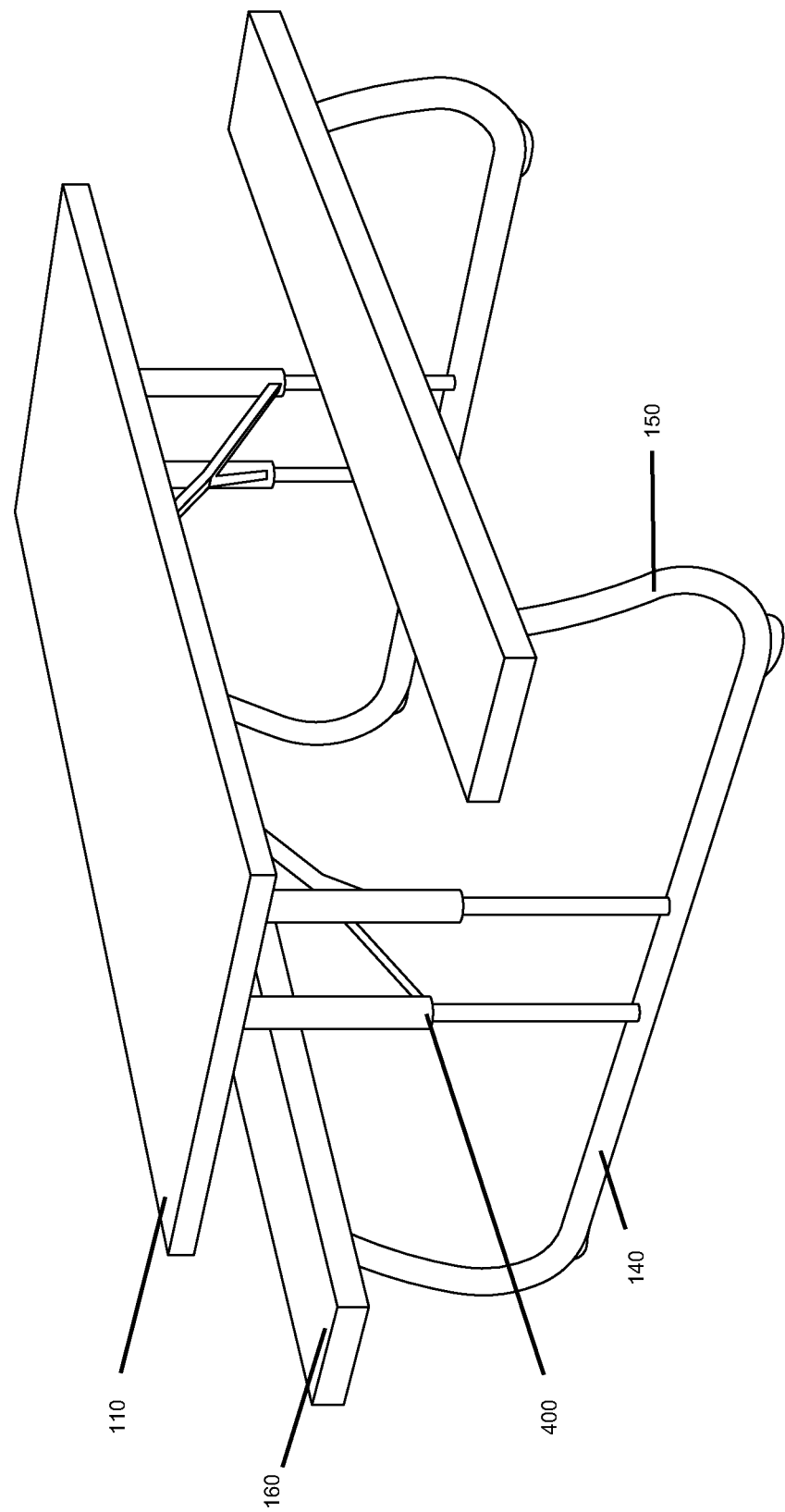
FIG. 11 is a perspective view of the prior art folding picnic table.

The table legs 120 have a telescoping portion 400 as seen in the prior art FIG. 11. Well known in the prior art are tables using the legs 120 on table top 110 and benches 160. The table folds first by using the telescoping portion 400 of legs 120 and decreasing the height of the table top 110, such that the table top 110 is now the same height as the benches 160. The legs 120 can then fold up towards both the table top 110 and benches 160. The current technology has a hinge 170 on the table top 110 and benches 160 to fold the table in half, perpendicular to a long axis. Table top 110 further consists of apertures 180. In one embodiment the apertures 180 are circular in shape and in another embodiment the apertures 180 are square in shape.

Figure 3:
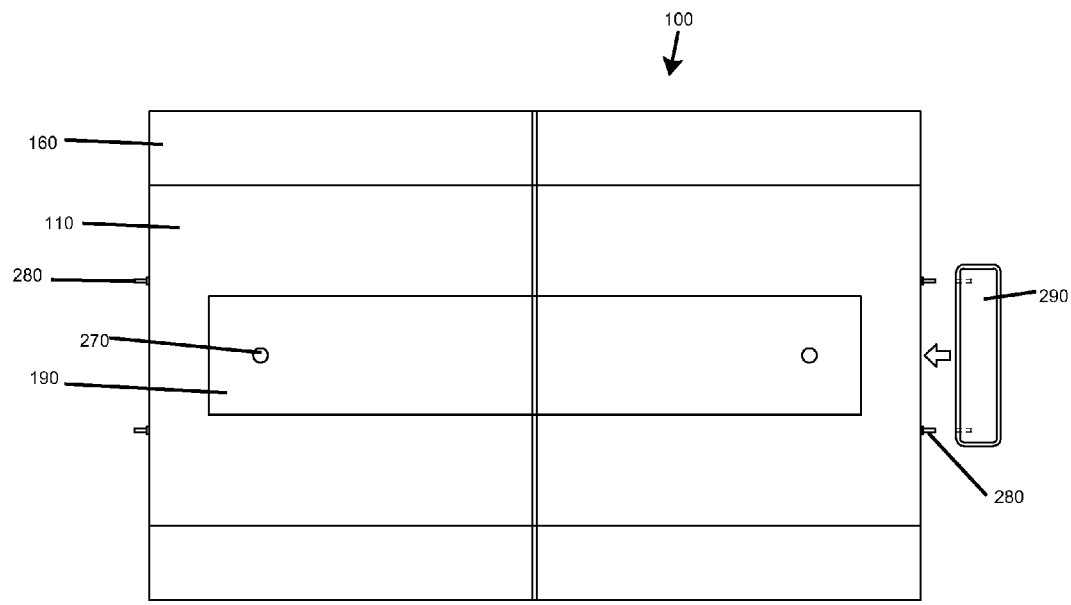
FIG. 3 is a top view of the portable picnic table in the open position with an optional condiment shelf and optional side table of the disclosed technology.
Figure 4:
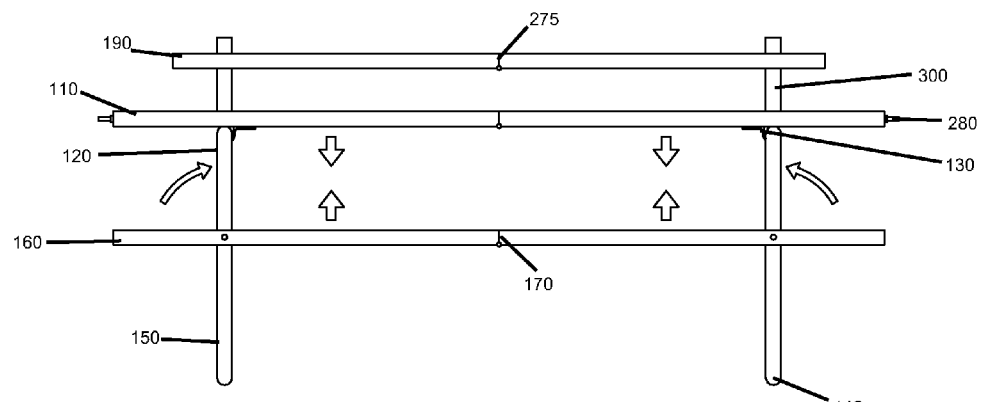
FIG. 4 is a side view of the portable picnic table in the open position with an optional condiment shelf of the disclosed technology.

Referring now to FIGS. 3 and 4, in another embodiment of the current invention, the table top 110 has a condiment shelf 190. In a first embodiment of the condiment shelf 190 there are legs 300 that support the condiment shelf 190 on the table top 110. In this first embodiment, these legs 300 are separate and will friction fit into apertures 180 for the table and apertures 270 for the condiment shelf 190. Apertures 180 and 270 can still be either circular or square. Condiment shelf 190 can also fold in half perpendicular to a long axis with hinges 275.

The condiment shelf legs 300 can alternatively be hollow and permanently attached to table top 110 with the condiment shelf legs 300 telescoping down into the table top apertures 180 for storage. Again the condiment shelf 190 would separate from table top 110 and the telescoping legs 300 would friction fit to the condiment shelf 190. Table top 110 optionally has protrusion members 280 that can be fit with scaffolding pins which are well known as used to connect items. Protrusion members 280 can receive a side table 290 for extra storage.

Figure 5:
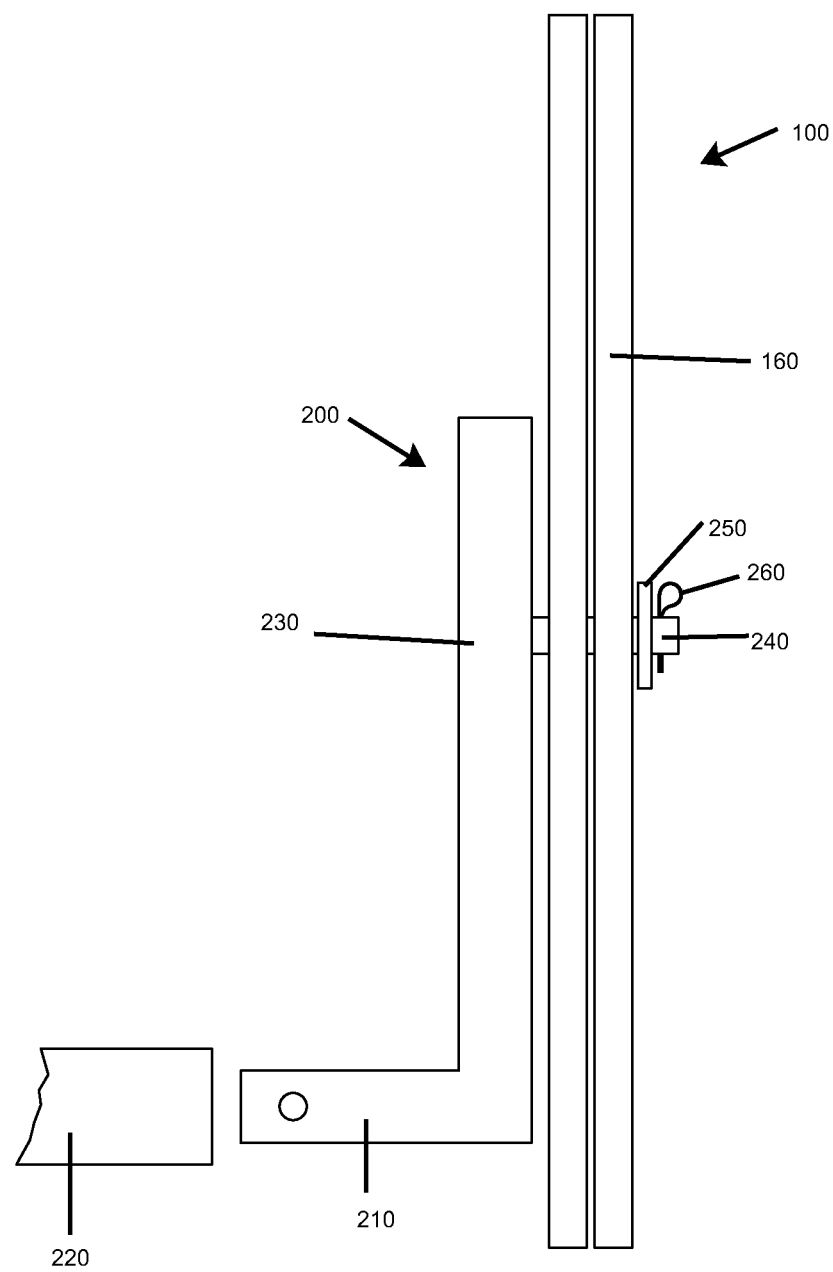
FIG. 5 is a side view of the portable picnic table attached to the transporting apparatus of the disclosed technology.

Once the table 100 is folded, it is ready for transport on a transporting apparatus 200 as seen in FIG. 5. The transporting apparatus 200 has lateral hitch member 210 for connecting to a trailer hitch receiver of a vehicle 220 on one end and a substantially vertical table mount member 230 on the other end. The substantially vertical table mount member 230 is anywhere from 90 to 135 degrees relative to the lateral hitch member 210. This embodiment of the table mount member 230 is 90 degrees. Substantially vertical mount member 230 has a mounting post 240 extending laterally from the table mount member 230. Apertures 180 of the table 100 are used to attach table 100 to a hitch transporting apparatus 200.

The mounting post 240 is placed through apertures 180 such that the table 100 is on the transporting apparatus 200. Mounting post 240 in one embodiment is cylindrical in shape and in another embodiment it is substantially a cube shape. A cap member 250 would be placed on the mounting post 240 to hold the table 100 in place during transport. Mounting post 240 would further consist of apertures to hold a locking pin 260 through the width of mounting post 240 which locks both the cap member 250 and the table 100 onto the mounting post 240.

Figure 6:
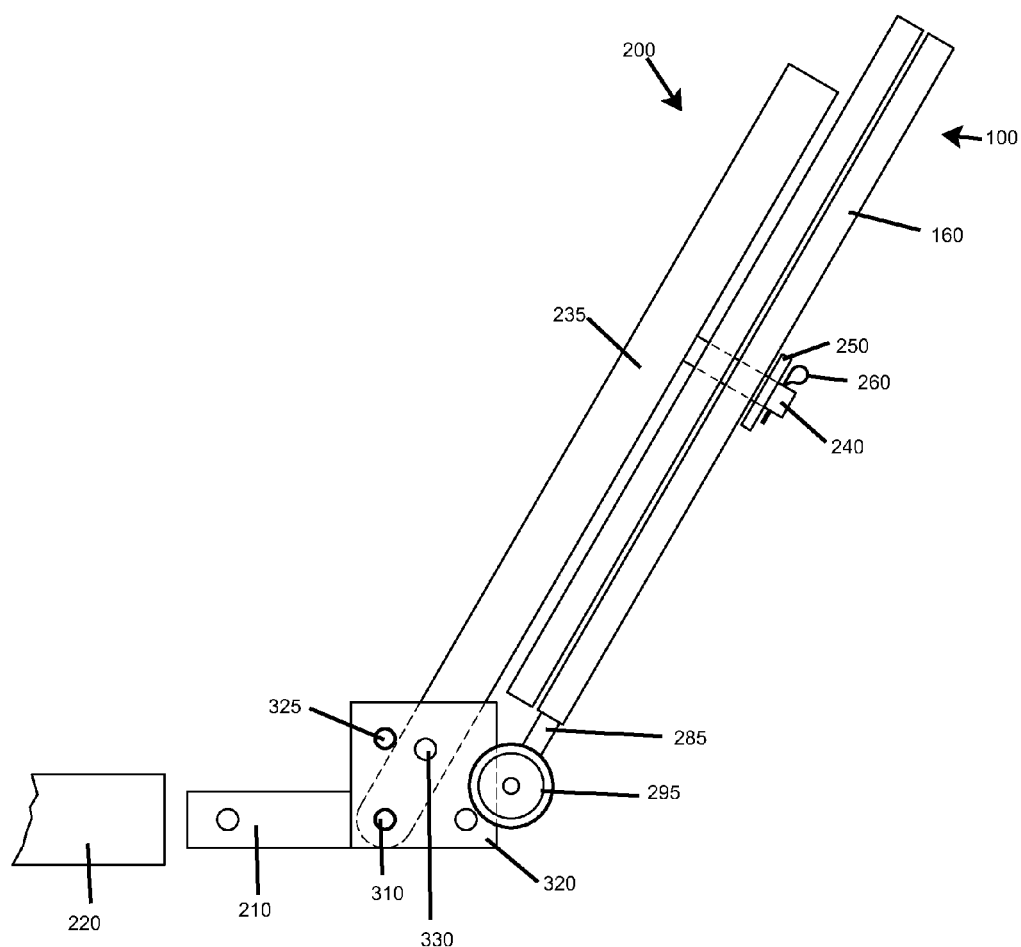
FIG. 6 is a side view of the portable picnic table attached to a second embodiment of the transporting apparatus and having optional wheel connections of the disclosed technology.
Figure 12:
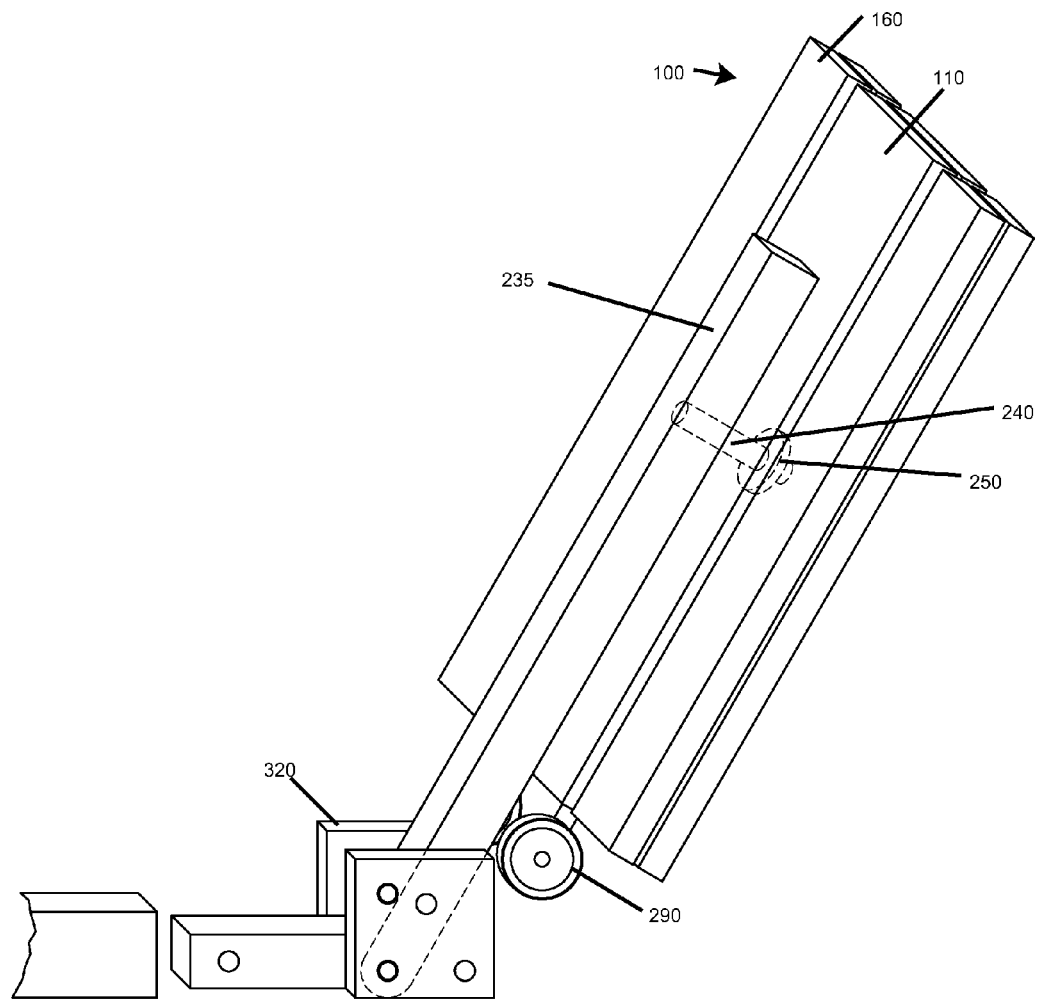
FIG. 12 is a perspective view of the portable picnic table attached to the second embodiment of the transporting apparatus and having optional wheel connections of the disclosed technology.

FIGS. 6 and 12 show a second embodiment of the transporting apparatus 200. Transporting apparatus 200 has lateral hitch member 210 for connecting to a trailer hitch receiver of a vehicle 220 on one end and an adjustable table mount 235 on the other end. Adjustable table mount 235 is connected to hitch member 210 with a hinge 310, preferably a pivoting hinge bolt. Hinge 310 can be any well known mechanism known in the art of pivoting. An outer support hinge complex 320 supports hinge 310 of table mount 235. Outer support hinge complex 320 further comprises a plurality of apertures 325. These apertures 325 are for adjustable hitch pin 330 to go through. Adjustable table mount 235 has an aperture to adjust the table mount 235 to a plurality of positions using adjustable hitch pin 330. The adjustable table mount 235 can be held in a plurality of positions. The preferred embodiment would be three positions. Adjustable table mount 235 has a mounting post 240 extending laterally there from.

Again referring to FIGS. 4 and 6, table top 110 has protrusion members 280 attached to scaffolding pins 285. Scaffolding pins 285 have a wheel 295 attached to the other end. There are at least two wheels 295 with only one being visible in this figure since this is a side view.

A method of transporting a table 100 using a transporting apparatus 200 of FIG. 6 would be the following. The table 100 would be transported by a vehicle on the transporting apparatus 200 to the desired location. Locking pin 260 is removed while the table 100 is held against the transporting apparatus 200. The adjustable table mount 235 would be lowered to a substantially horizontal position by removing hitch pin 330 and lowering the adjustable table mount 235. Table 100 would be taken off of table mounting post 240 while the adjustable table mount 235 is in the substantially horizontal position. Once the table 100 is off of the transporting apparatus 200, table 100 would be lifted by a user on the opposite end than the wheels 295. Table 100 could further be rolled by wheels 295 to a location desired. For example, if the desired location was where the vehicle could not go easily.

Figure 7:
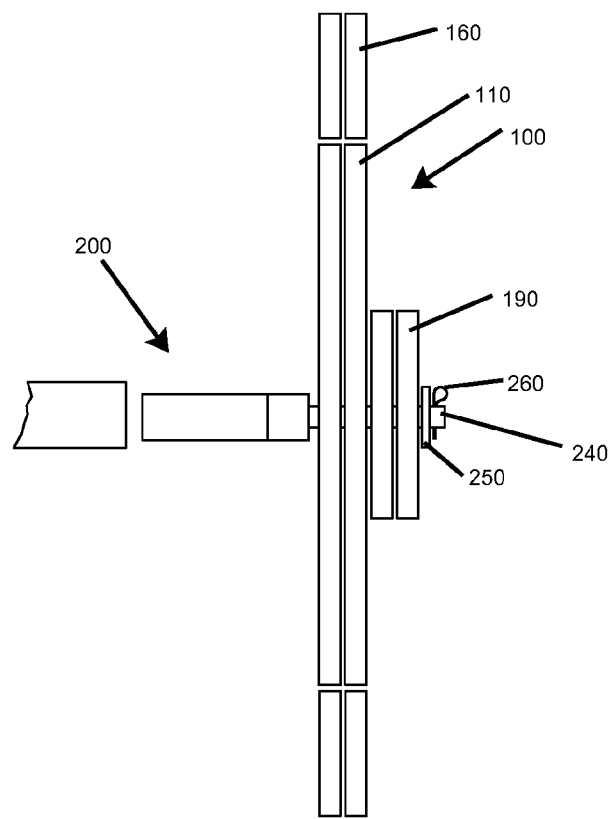
FIG. 7 is a top view of the portable picnic table with a detachable condiment shelf attached to a transporting apparatus of the disclosed technology.

Now referring to FIG. 7, a transporting apparatus 200 is shown from the top view. Table 100 and the optional condiment shelf 190 are attached to the transporting apparatus 200. Benches 160 and table top 110 can clearly be seen from this view.

Figure 8:
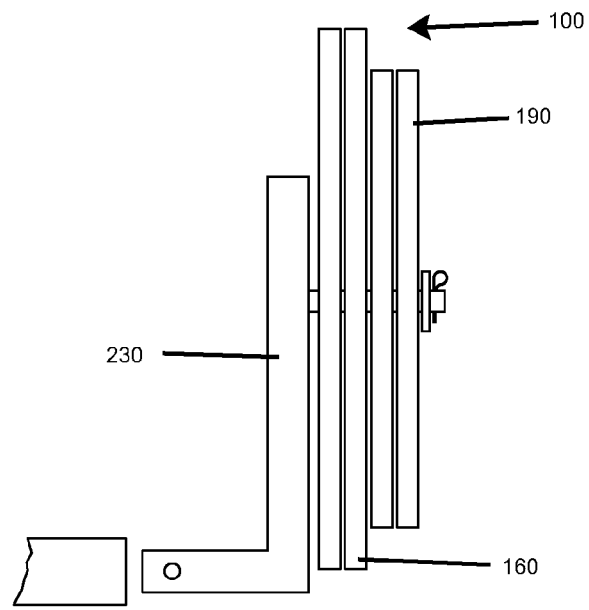
FIG. 8 is a side view of the portable picnic table with a detachable condiment shelf attached to the transporting apparatus of the disclosed technology.

FIG. 8 is the side view of a transporting apparatus 200 transporting a table 100 with the optional condiment shelf 190. Again, the folded table 100 would first be put on the mounting post 240 and then the folded condiment shelf 190 would be put on the mounting post 240. In one embodiment, legs 300 and side table 290 would need to be transported separately and not on the hitch apparatus. Preferably there would be a reusable bag for the legs 300 and side table 190. If legs 300 are the hollow and telescoping version, they would telescope into table top 110 and help form the apertures 180. In this embodiment the side table 290 would be transported separately and not on the hitch apparatus. Wheels 295 also can be removed from the table and not transported on the hitch apparatus.

Figure 9:
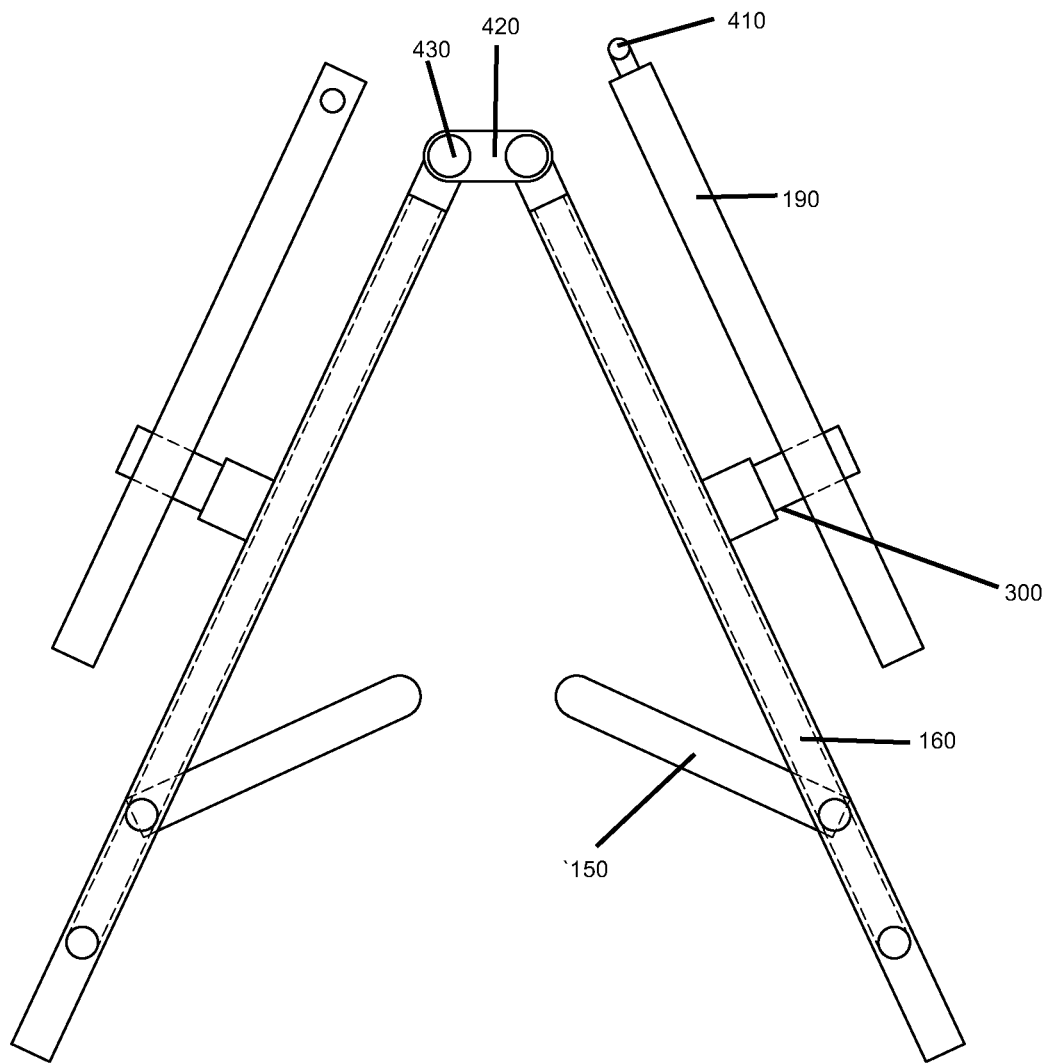
FIG. 9 is a side view while folding of third embodiment of the portable picnic table having a condiment shelf attached.
Figure 13:
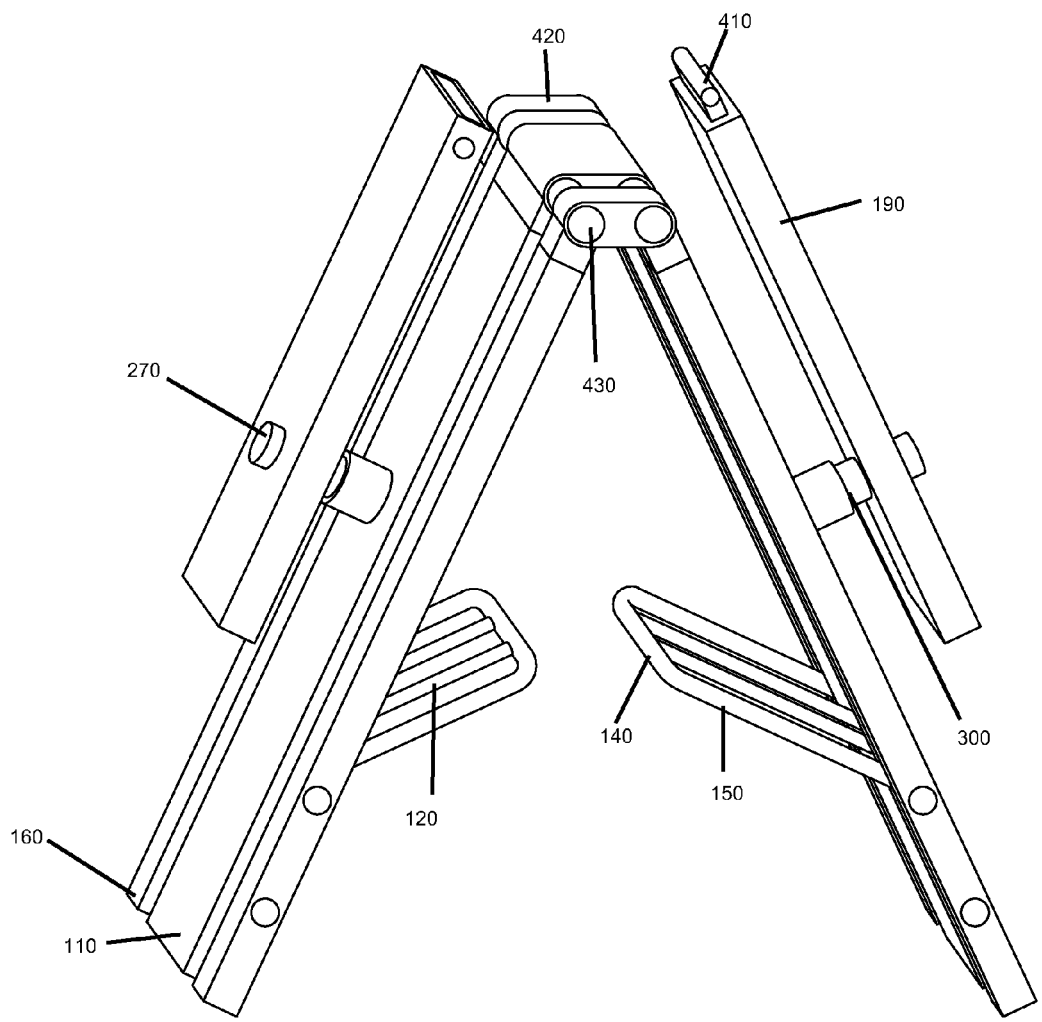
FIG. 13 is a perspective view while folding of the third embodiment of the portable picnic table having a condiment shelf attached.

Now referring to FIGS. 9 and 13. In another embodiment of table 100, the condiment shelf 190 is not removable. The table 100 also folds in a different way to accommodate this. Table top 110 and benches 160 both have hollow openings on each side of the long axis of the table top 110 and benches 160 for sliding tracks 420 inside the hollow openings. The hollow openings for sliding tracks 420 run the length of the table top 110 and benches 160.

The table 100 of this embodiment folds first by using the telescoping portion 400 as seen in FIG. 11 of legs 120. The height of the table top 110 is decreased, such that the table is now the same height as the benches 160. The legs 120 can then fold up towards both the table top 110 and benches 160 as FIG. 9 clearly illustrates. The table top 110, benches 160 and condiment shelf 190 come apart instead of hinge at the half point, perpendicular to the long axis. Benches 160 and table top 110 come apart but are still connected by sliding tracks 420. Sliding tracks 420 have pivoting sections 430 such that the table top 110 and benches 160 can fold in half.

Condiment shelf 190 comes completely apart when folding and is not still connected. Pin 410 could also be a U clip or any other well known means to attach and detach items can be used to attach and detach the condiment shelf 190. Condiment shelf 190 is attached to table top 110 with hollow telescoping legs 300. Condiment shelf 190 simply separates into two halves and then is lowered with telescoping legs 300 until it is abutting the table top 110.

Figure 10:
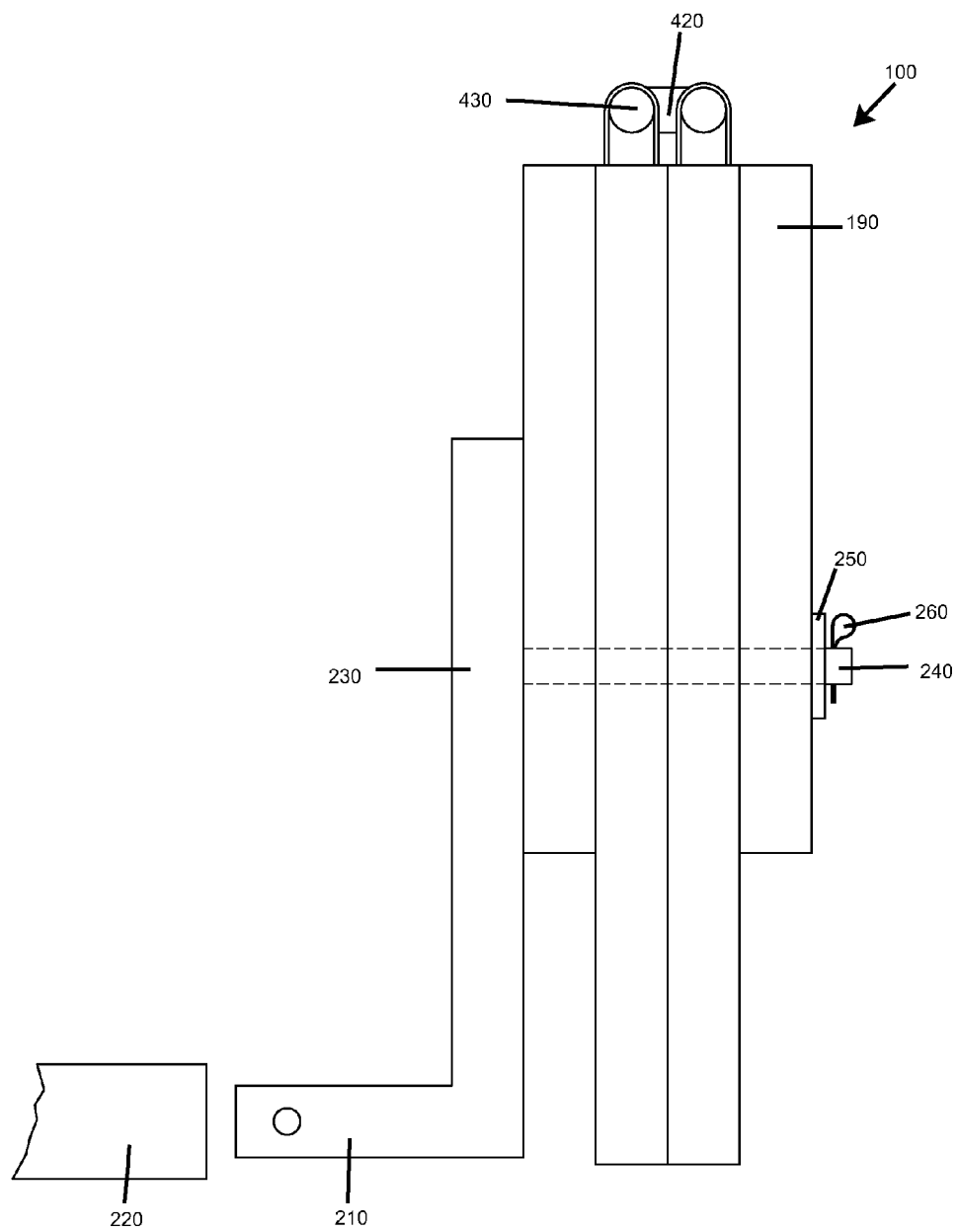
FIG. 10 is a side view of the FIG. 9 embodiment of the portable picnic table having condiment shelf attached on a transporting apparatus of the disclosed technology.

The table 100 described above is put on transporting apparatus 200 as seen in FIG. 10. Substantially vertical mount member 230 has a mounting post 240 extending laterally from the vertical table mount member 230. Apertures 180 of the table 100 and apertures 270 of condiment shelf 190 through hollow legs 300 are used to attach table 100 with condiment shelf 190 to a hitch transporting apparatus 200.

The mounting post 240 is placed through apertures 180 and 270 with hollow legs 300 such that the table 100 is on the transporting apparatus 200. A cap member 250 would be placed on the mounting post 240 to hold the table 100 with condiment shelf 190 in place during transport. Mounting post 240 would further comprise apertures to hold a locking pin 260 through the width of mounting post 240 which locks both the cap member 250 and the table 100 with condiment shelf 190 onto the mounting post 240.

FIG. 11 describes the prior art of a folding picnic table. Table top 110 folds first by using the telescoping portion 400 of legs 120 and decreasing the height of the table 110, such that the table is now the same height as the benches 160. The legs 120 can then fold up towards both the table top 110 and benches 160.

The table can be attached to the transport apparatus along its length as in FIG. 8 or along its width. The material for the transporting apparatus would preferably be metal. The material for the table would preferably be powder coated metal. Table could also be made of metal, plastic, resin, wood or any well know picnic table material.

The table can be any size of picnic table from 4 to 14 feet long. The table width can be any of the common sizes of picnic tables, such as 30 or 31 inches wide. The bench width can also be any of the common sizes of benches, such as 10 or 11 inches wide. A table of 4 feet would not have to be folded to fit onto the transporting apparatus. For tables ranging from 6 to 14 feet, the table mounting post would be placed higher on the table mount. Table mounting post would be placed higher on the table mounting post of the hitch apparatus as to match the tables they come with. The mounting post placement is higher for longer tables and can be lower for shorter tables.

The hitch can be of any well known size for hitch receivers. Wheels are preferably 10 inches in diameter and 3 inches wide. Tires made of rubber would be preferable for the wheels.

It is recognized by those skilled in the art that changes may be made to the above described embodiments of the disclosed technology without departing from the broad inventive concept thereof. It is understood, therefore, that this technology is not limited to the particular embodiments disclosed but is intended to cover all modifications which are in the spirit and scope of the disclosed technology.

I claim:

1. A picnic table and transportation apparatus comprising;
   a lateral hitch member for connecting to a trailer hitch receiver of a vehicle on one end;
   a substantially vertical table mount member on the other end of a lateral hitch member;
   a mounting post extending laterally from the substantially vertical table mount member;
   a folding picnic table entirely detachable from the mounting post, the folding picnic table including a table to with apertures extending through the table top, the apertures adapted to receive the mounting post when the table to is folded and the apertures are aligned, such that the folding picnic table attaches for transport to the mounting post by inserting the mounting post through the apertures on the table top and locking the picnic table in place on the mounting post;
   said folding picnic table having legs supporting folding picnic table in an open position;
   and folding picnic table self-supported and not supported by transportation apparatus while in an open position.

2. A picnic table and transportation apparatus of claim 1, wherein an angle between said substantially vertical table mount member and said lateral hitch member is between 90 and 135 degrees, inclusive.

3. A picnic table and transportation apparatus of claim 1, wherein the folding picnic table folds in half perpendicular to a long axis.

4. The picnic table and transportation apparatus of claim 3, wherein the table top has a plurality of protrusions extending laterally from one or both ends of the table top.

5. The picnic table and transportation apparatus of claim 4, wherein the protrusions are used to connect a side table when the table is open.

6. The picnic table and transportation apparatus of claim 5, wherein the table top protrusions connect to the side table with scaffolding pins.

7. The picnic table and transportation apparatus of claim 4, wherein the protrusions are used to connect wheels when the table is closed.

8. The picnic table and transportation apparatus of claim 7, wherein the table top protrusions connect to wheels with scaffolding pins.

9. A picnic table and transportation apparatus of claim 3, wherein apertures of a folding picnic table are placed on the mounting post extending laterally from the table mount member such that the folding picnic table can be transported on a vehicle.

10. A picnic table and transportation apparatus of claim 9, wherein the mounting post further comprises: a removable circular cap member having an aperture which goes on the mounting post after the table; mounting post having sides with two apertures across from each other such that a pin member can go through the apertures of the mounting post to hold picnic table and cap member onto the table mount member.

11. A picnic table and transportation apparatus of claim 1, where in the mounting post is a cylindrical shape and the apertures of the table are circular.

12. A picnic table and transportation apparatus of claim 1, where in the mounting post is a rectangular in cross section and the apertures of the table are square.

13. A picnic table and transportation apparatus of claim 1, wherein the folding picnic table further comprises a condiment shelf; the condiment shelf having an underside and a top side; the picnic table top having an underside and a topside; the underside of said condiment shelf having a plurality of legs connecting the condiment shelf to the table top topside such that the condiment shelf is positioned horizontally above the table top when the table is open.

14. The picnic table and transportation apparatus of claim 13, wherein the condiment shelf has apertures and folds in half perpendicular to a long axis.

15. The picnic table and transportation apparatus of claim 14, wherein the apertures of the folding picnic table and the apertures of the condiment shelf are placed on the mounting post extending laterally from the substantially vertical table mount member such that the folding picnic table and condiment shelf can be transported on a vehicle.

16. The picnic table and transportation apparatus of claim 1, wherein the table mount member is movably attached to the lateral hitch member, such that the table mount member is adjustable to a plurality of positions.

17. The picnic table and transportation apparatus of claim 16, wherein an angle between said table mount member and said lateral hitch member moves between 90 and 180 degrees, inclusive.

18. A picnic table and transportation apparatus of claim 1, with a folding picnic table comprising:
   a table top having a top side and an under side;
   two benches having a top side and an under side;
   the table top having four legs;
   each leg has two ends and is U-shaped;
   one end of each leg is movably attached and starts at the underside of the table top and curve around to movably attach to underside of the benches, two legs to each bench;
   the U-shaped bottom of the legs rests on the ground supporting both the table top and two benches;
   each leg has a telescoping portion to lower the table top to bench height;

each leg folds up to be adjacent to the table top and benches;

the table top also having hollow areas on each side of the table along the length of the table;

the benches also having hollow areas on each side of the bench along the length of the bench;

hollow areas of the table top and benches having sliding tracks inside;

the table and benches separate into halves perpendicular to a long axis while still being connected by the sliding tracks;

sliding tracks having pivoting sections such that the table top and benches can fold in half perpendicular to the long axis but stay connected by the sliding tracks.

19. The folding picnic table of claim 18, wherein the folding picnic table further comprises a condiment shelf; the condiment shelf having an underside and top side; a plurality of legs connected to the condiment shelf underside and to the table top topside to position the condiment shelf horizontally above the table top when the table is open.

20. The folding picnic table of claim 19, wherein the condiment shelf separates into halves perpendicular to the long axis while still being connected to the plurality of legs connected to the condiment shelf underside; and the plurality of legs are hollow and telescoping and shorten such that the condiment shelf underside is adjacent to the topside of the table top when the table is in a folded position.

21. The folding picnic table of claim 20, wherein the condiment shelf and table have apertures for transport with a transport apparatus.

22. The folding picnic table of claim 18, wherein the table top has protrusions from one end and these protrusions are used to connect wheels with scaffolding pins.

23. The folding picnic table of claim 18, wherein table top has protrusions protruding from one end and these protrusions are used to connect a side table with scaffolding pins.

24. A method of transporting a picnic table using a transporting apparatus comprising:

folding a picnic table having apertures in the table top by first using telescoping legs to lower a table top to the same height as two benches;

folding legs attached to both benches and table top such that the legs are adjacent to the table top and benches;

then folding benches and table top in half perpendicular to a long axis such that the apertures on either side of the table top are now juxtaposed;

placing apertures of the table top on a mounting post of a transporting apparatus;

transporting apparatus attached to a hitch receiver of a vehicle;

transporting the folding picnic table on the transporting apparatus by driving the vehicle to the location desired.

25. The method of claim 24 wherein the folding picnic table would have wheels attached on the end of the table closest to the ground;

a locking pin on a mounting post would be removed;

an adjustable table mount would be lowered to a substantially horizontal position by removing a hitch pin and lowering the adjustable table mount;

the folding picnic table is taken off of table mount when the adjustable table mount is at a substantially horizontal position;

the folding picnic table is lifted by a user on the opposite end than the wheels;

folding picnic table is now rolled to a location desired.

26. A folding picnic table comprising;

a table top having a top side and an underside;

two benches having a top side and an underside;

the table top having four legs;

each leg has two ends and is U-shaped;

one end of each leg is movably attached and starts at the underside of the table top and curve around to movably attach to an underside of benches, two legs to each bench;

the U-shaped bottom of the legs rests on the ground supporting both the table top and two benches;

each leg has a telescoping portion to lower the table top to bench height;

each leg folds up to be adjacent to the table top and benches:

the table top also having hollow areas on each side of the table along the length of the table;

the benches also having hollow areas on each side of the bench along the length of the bench;

the hollow areas of the table top and benches having sliding tracks inside;

the table and benches separate into halves perpendicular to a long axis while still being connected by the sliding tracks;

the sliding tracks have pivoting sections such that the table top and benches can fold in half perpendicular to the long axis but stay connected by sliding tracks.

\* \* \* \* \*